United States Patent [19]
Körner

[11] Patent Number: 5,434,793
[45] Date of Patent: Jul. 18, 1995

[54] METHOD AND APPARATUS FOR ASCERTAINING TOOL PATH CONTOURS APPROXIMATING CURVED CONTOUR INTERSECTION LINES IN NUMERICALLY CONTROLLED MACHINES

[75] Inventor: Klaus-Dieter Körner, Traunstein, Germany

[73] Assignee: Johannes Heidenhain GmbH, Traunreut, Germany

[21] Appl. No.: 765,127

[22] Filed: Sep. 25, 1991

[30] Foreign Application Priority Data

Sep. 25, 1990 [EP] European Pat. Off. ......... 90118384.8

[51] Int. Cl.⁶ .............................................. G05B 19/18
[52] U.S. Cl. ................... 364/474.31; 318/573
[58] Field of Search ............... 364/474.28–494.33, 364/167.01; 318/569–573

[56] References Cited

U.S. PATENT DOCUMENTS

| | | | |
|---|---|---|---|
| 3,629,558 | 12/1971 | Coggin | 235/151.1 |
| 3,634,661 | 1/1972 | Fitzner | 318/573 |
| 3,703,327 | 11/1972 | Pomella et al. | 318/573 |
| 3,767,990 | 10/1973 | Kreithen et al. | 318/573 |
| 3,860,805 | 1/1975 | Strukel | 364/474.31 |
| 3,927,948 | 12/1975 | Cox et al. | 356/167 |
| 3,969,615 | 7/1976 | Bowers et al. | 318/573 |
| 4,031,369 | 6/1977 | Heaman et al. | 364/424.31 |
| 4,127,849 | 11/1978 | Okor | 340/324 AD |
| 4,275,449 | 6/1981 | Aish | 364/512 |
| 4,503,493 | 3/1985 | Burkhardt et al. | 364/170 |
| 4,506,335 | 3/1985 | Magnuson | 364/474.31 |
| 4,528,632 | 7/1985 | Nio et al. | 364/474.31 |
| 4,536,848 | 8/1985 | d'Entremont et al. | 364/526 |
| 4,550,383 | 10/1985 | Sugimoto | 364/474.31 |
| 4,551,810 | 11/1985 | Levine | 364/475 |
| 4,575,791 | 3/1986 | Schwefel | 364/168 |
| 4,581,698 | 4/1986 | Jaswa | 318/573 |
| 4,586,145 | 4/1986 | Bracewell et al. | 364/512 |
| 4,648,024 | 3/1987 | Kato et al. | 318/573 |
| 4,704,685 | 11/1987 | Kamata | 364/474.31 |
| 4,757,461 | 7/1988 | Stöhr et al. | 364/518 |
| 4,791,579 | 12/1988 | Kranitzky | 364/518 |
| 4,792,889 | 12/1988 | Krägelin et al. | 364/191 |
| 4,833,617 | 5/1989 | Wang | 364/474.15 |
| 4,841,430 | 6/1989 | Nakasawa et al. | 364/474.31 |
| 4,858,140 | 8/1989 | Buhler et al. | 364/474.31 |
| 4,868,761 | 9/1989 | Hayashi | 364/474 |

(List continued on next page.)

FOREIGN PATENT DOCUMENTS

| | | | |
|---|---|---|---|
| 0083836 | 11/1982 | European Pat. Off. | G05B 19/405 |
| 0117614 | 1/1984 | European Pat. Off. | G05B 19/405 |
| 0121100 | 2/1984 | European Pat. Off. | G05B 19/42 |
| 0144585 | 9/1984 | European Pat. Off. | G05B 19/405 |
| 7130870 | 4/1972 | France | G08C 21/000 |
| 3401060 | 1/1986 | Germany | G09G 1/00 |
| 2140937 | 12/1984 | United Kingdom | G05B 23/02 |

OTHER PUBLICATIONS

Wang et al.; Geometric Modeling for Swept Volume of Moving Solids; Dec. 1986, pp. 8–17, IEEE CG & A.
Proceedings of the 1966 IEEE International Conference on Robotics and Automation, vol. 1, Apr. 1986, New York U.S., pp. 156–165; Sungurtekin & Voelcker; "Graphical Simulation and Automatic Verification of NC Machine Programs".

(List continued on next page.)

*Primary Examiner*—James P. Trammell
*Attorney, Agent, or Firm*—Willian Brinks Hofer Gilson & Lione

[57] ABSTRACT

The method and apparatus according to the present invention interpolates curves with arbitrary accuracy. The accuracy is predetermined by a scalar value and indicates the maximum deviation (d) of a linearization segment of the curve (K). The maximum deviation (d) in this case is defined as the length of a vertical (d) which results from the intersection of the vertical from the rectilinear interpolation line between the points P1 and P2 of an interval with the curve (K) itself and the rectilinear interpolation line ($K_i$). The increment width is determined dynamically, that is, the number of interpolating linearizing segments depends on the concrete properties of the curve such as the curve parameters.

32 Claims, 2 Drawing Sheets

U.S. PATENT DOCUMENTS

| | | | |
|---|---|---|---|
| 4,870,597 | 9/1989 | Seki et al. | 364/474 |
| 4,879,667 | 11/1989 | Gorski et al. | 364/522 |
| 4,903,213 | 2/1990 | Buhler et al. | 364/474.31 |
| 5,103,150 | 4/1992 | Sasaki et al. | 364/474.31 |
| 5,124,929 | 6/1992 | Arlt | 364/474.31 |
| 5,197,014 | 3/1993 | Seki et al. | 364/474.31 |
| 5,204,599 | 4/1993 | Hohn | 364/474.31 |
| 5,214,591 | 5/1993 | Sasaki et al. | 364/474.31 |
| 5,229,698 | 7/1993 | Minnich et al. | 364/474.31 |

OTHER PUBLICATIONS

General Electric Technical Information Series, May 1984, W. Wang, "Solid Geometric Modeling for Mold Design and Manufacture", pp. 1–30.

The Polygon Package, E. E. Barton and I. Buchanan, vol. 12, No. 1, Jan. 1980.

Pioneering in Technology, Proceedings 17th Numerical Control Society Annual Meeting and Technical Conference, Apr. 27, 1980.

METHOD AND APPARATUS FOR ASCERTAINING TOOL PATH CONTOURS APPROXIMATING CURVED CONTOUR INTERSECTION LINES IN NUMERICALLY CONTROLLED MACHINES

REFERENCE TO RELATED APPLICATIONS

The disclosures of the following copending applications assigned to the assignee of the present application and filed concurrently herewith are specifically incorporated by reference:

"Method and Apparatus for Ascertaining Tool Path Contours in Numerically Controlled Machines", by Norbert Vollmayr U.S. Ser. No. 07/765,377; U.S. Pat. No. 5,353,232, and "Method and Apparatus for Machining Workpieces with Numerically Controlled Machines" Klaus-Dieter Körner U.S. Ser. No. 07/765,562, U.S. Pat. No. 5,295,075.

BACKGROUND OF THE INVENTION

1. Field of the Invention

The invention relates to a method and apparatus for ascertaining tool path contours approximating curved contour intersection lines by means of numerically controlled machines and particularly to a method of interpolating a curved contour intersection line so that a machine cutting tool path contour approximates the curved contour.

2. Description of the Prior Art

In numerically controlled (NC) machine tools, data is determined for producing a workpiece from a workpiece blank in the form of tool path data by means of an NC program. This requires correcting the contour of the workpiece to be produced with the tool radius, since it is not the workpiece contour but rather the center point of the tool path that is relevant to the machine in producing the workpiece.

For NC control, calculating the corrected sectional contour of a given body is a complex task requiring a great deal of calculation. Difficulties reside in defining a complex body and its surface and in calculating an equal distance for the cutter radius correction, taking possible collisions into account with a given accuracy. The amount of computer capacity and memory capacity needed is correspondingly high. To perform such calculations, additional hardware and software are necessary on the NC control computer. These include special arithmetic processors, for instance, as well as geometric methods and display methods for describing free-form surfaces.

It is known that relatively complex body contours can be constructed from simple contour parts such as circles and rectilinear lines. The tool radius corrections can be easily carried out with these simple contours. It becomes problematic, however, to ascertain the resultant tool path from the various corrected contours constructed to form the complex body since overlapping occurs when the various corrected contours are put together. Specifically, the tool path contours determined by the corrected path data do not necessarily coincide with the intersection lines of the assembled contour parts.

Accordingly, it is an object of the present invention to provide a method for simplifying the machining of curved intersection lines by bringing a tool path contour in close approximation to the curved contour.

A further object of the present invention is to provide a method of interpolating the curved contour taking into account the resolution of the machine.

A further object of the present invention is the elimination of the requirement of defining an incremental width, i.e. the length of an interpolation interval or a linearizing segment in advance and for the entire curve.

A still further object of the present invention is to provide a method of interpolating a curved contour intersection line so that only so many linearizing segments are made as are necessary so as not to exceed the maximum error. This results in linearizing segments closely approximating the curved contour while reducing the quantity of data and saving memory space. The interpolation may be conducted using 3-D rectilinear segments generated as a function of the actual curvature of the curved contour.

SUMMARY OF THE INVENTION

The present invention provides a method and apparatus for processing workpieces by linking the data of workpiece blanks with tool path data into intersecting lines by means of a numerical control. The curved contours of the intersecting lines are linearized by segments to create linearized contours.

In an embodiment of the present invention, a method and apparatus for interpolating a desired contour to bring a tool path contour within an arbitrary approximation of the desired contour is disclosed. The tool path contour is normally composed of linear segments spanning fixed intervals. The method of the present invention creates linear segments representative of the tool path which span intervals determined by the interpolation. More specifically, the parameters off the desired contour are defined. A particular fixed interval having a starting point and an ending point is chosen. The maximum deviation between the linear segment and the desired contour in a fixed interval is determined. The deviation is compared with a predetermined value. If the deviation is greater than the predetermined value, two new intervals are created. The first new interval begins at the starting point of the fixed interval and ends at the point where the maximum deviation was determined. The second new interval starts at the point where the maximum deviation was determined and ends at the ending point of the fixed interval. The linear segment spanning the fixed interval is replaced with new linear segments spanning the new intervals to provide a better approximation to the desired contour.

The above described steps continue for each new interval created until the deviation determined within an interval is less than the predetermined value. The number of new intervals created and the lengths of the new linear segments are determined by the degree of curvature of the desired contour.

BRIEF DESCRIPTION OF THE DRAWINGS

Further objects and advantages of this invention will become more apparent and readily appreciated from the following detailed description of the present invention, taken in conjunction with the accompanying drawings of which.

DETAILED DESCRIPTION OF THE PREFERRED EMBODIMENT

To simplify ascertaining the tool path contours or the path data thereof, a cutter path correction is performed using a simple 2-D contour. This tool path contour forms a corrected 2-D contour. The corrected 2-D contour is shifted along a vector, for instance translationally, and in this way a corrected 3-D article is formed. The surfaces of a corrected body describe areas equidistant to the surfaces of the basic body.

Assembly of the desired body for the workpiece to be produced is done using the already-corrected bodies, so that the tool path contours coincide with the intersecting lines of a complete body that has been put together and has already been corrected.

The intersecting lines between the corrected surfaces and the applicable machining plane are now calculated. The intersecting lines can be rectilinear segments created by bodies generated by translation or curves of generally conical or cylindrical sections created by bodies generated by rotation.

The tool path numerically controlled milling machine approximates a curved contour intersection line by rectilinear segments. The rectilinear segments span fixed equal width intervals. It can be appreciated that as the magnitude of curvature of the curved contour intersection line increases, the rectilinear segments spanning a fixed width interval provide a poor approximation to the curve.

Figure 1A:
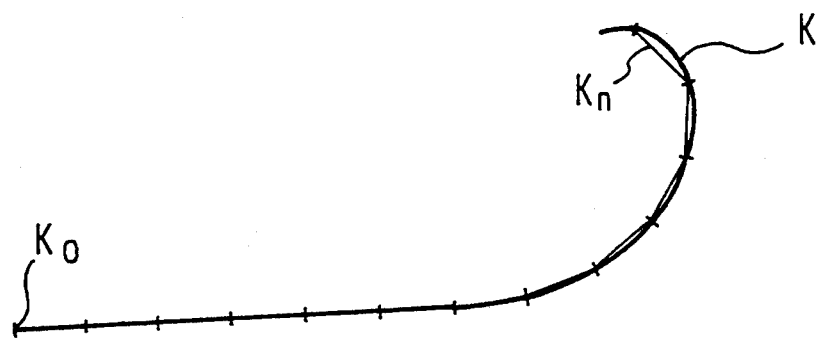
FIG. 1 illustrates a cutter path contour and a curved contour intersection line K.
FIG. 1B is an enlarged segment of the cutter path contour and the curved contour K shown in FIG. 1A.
Figure 1B:
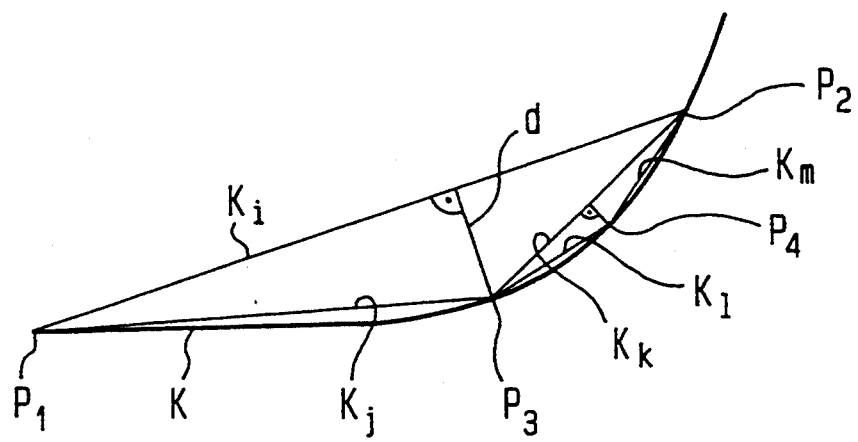

In FIG. 1A an curved contour K representing an intersection line is shown. The contour K may be a second order curve defined by the equation $y^2 = a1 \cdot x^2 + a2 \cdot x + a3$. This contour K can be approximated by rectilinear segments $K_i$ where $i = O \ldots, n$ as shown in FIGS. 1A and 1B. According to the prior art, a milling cutter approximates the curved contour by means of rectilinear segments $K_i$, where $i = O \ldots n$, of a fixedly defined grid pattern. Since the width of the intervals through which the rectilinear segments span is fixed, the deviation of the cutter produced contour from the desired curved contour K increases as the curvature of the contour K increases. For example, in FIG. 1A it can be seen that segments $K_o$ through $K_n$ are equal in length, each segment spanning through an equal width interval. It can be seen that the segments deviate from the contour K along the portion where the contour K has the greatest degree of curvature.

The exaggerated view in FIG. 1B illustrates the departure of the actual tool contour from the desired contour K along a particular rectilinear segment $K_i$. As discussed above, the contour K is replicated by rectilinear segments, of which only the segment $K_i$ is shown here. A milling cutter (not shown) would join points $P_1$ and $P_2$ along segment $K_i$ by means of its cutter path.

The method according to the present invention interpolates the above-defined curve K with arbitrary accuracy. The accuracy is predetermined by a scalar magnitude and indicates the maximum deviation of a rectilinear segment from the curve K. The maximum deviation is defined as the length of a vertical "d". The vertical "d" extends between the milling cutter path contour $K_i$ and the desired contour K at a point between points $P_1$ and $P_2$ where the deviation of the cutter contour $K_i$ from the desired contour K is greatest.

To improve the approximation of the tool path contour $K_i$ to the contour K, the vertical is accordingly dropped from the rectilinear segment $K_i$ onto the contour K, and the location of the greatest deviation is ascertained. The point of intersection of the contour K and the vertical "d" defines a point $P_3$.

The increment width of an interval is advantageously determined dynamically, that is, the number of linearizing segments depends upon the concrete properties of the curve K, such as, the curve parameters a1, a2 and a3 according to the equation described above.

The NC control, with the aid of which point $P_3$ was ascertained, defines as new linearizing segments the rectilinear lines $K_j$ and $K_k$. The new linearizing segments divide the interval from $P_1$ to $P_2$ into two new intervals. Segment $K_j$ connects points $P_1$ and $P_3$ and segment $K_k$ connects points $P_3$ and $P_2$. It is evident that the linearization by the new rectilinear segments $K_j$ and $K_k$ produces a better approximation to the desired contour K.

If the same interpolation procedure is employed with the new linearizing segment $K_k$, two further linearizing segments $K_l$ and $K_m$ are produced. The two segments $K_l$ and $K_m$ provide a closer approximation to the ideal contour K than did segment $K_k$ as is evident from FIG. 1B. It can be seen that with this method for curvature-dependent linearizing, the linearizing segment width also becomes curvature-dependent. With this method, the path of the cutter is brought within close approximation to the ideal contour K.

By using this recursive algorithm, which utilizes the properties of the curve defined by the above-referenced equation, the expenditure for administration and memory in generating the interpolated linearizing segments is optimized.

The method is distinguished by a rapid convergence in attaining the object, which is to bring the tool path contour within a close approximation of the desired contour K, since the interpolation automatically migrates into the range of curve K in which the curvature is greatest, and thus requires the most linearizing segments for interpolation.

Figure 2:
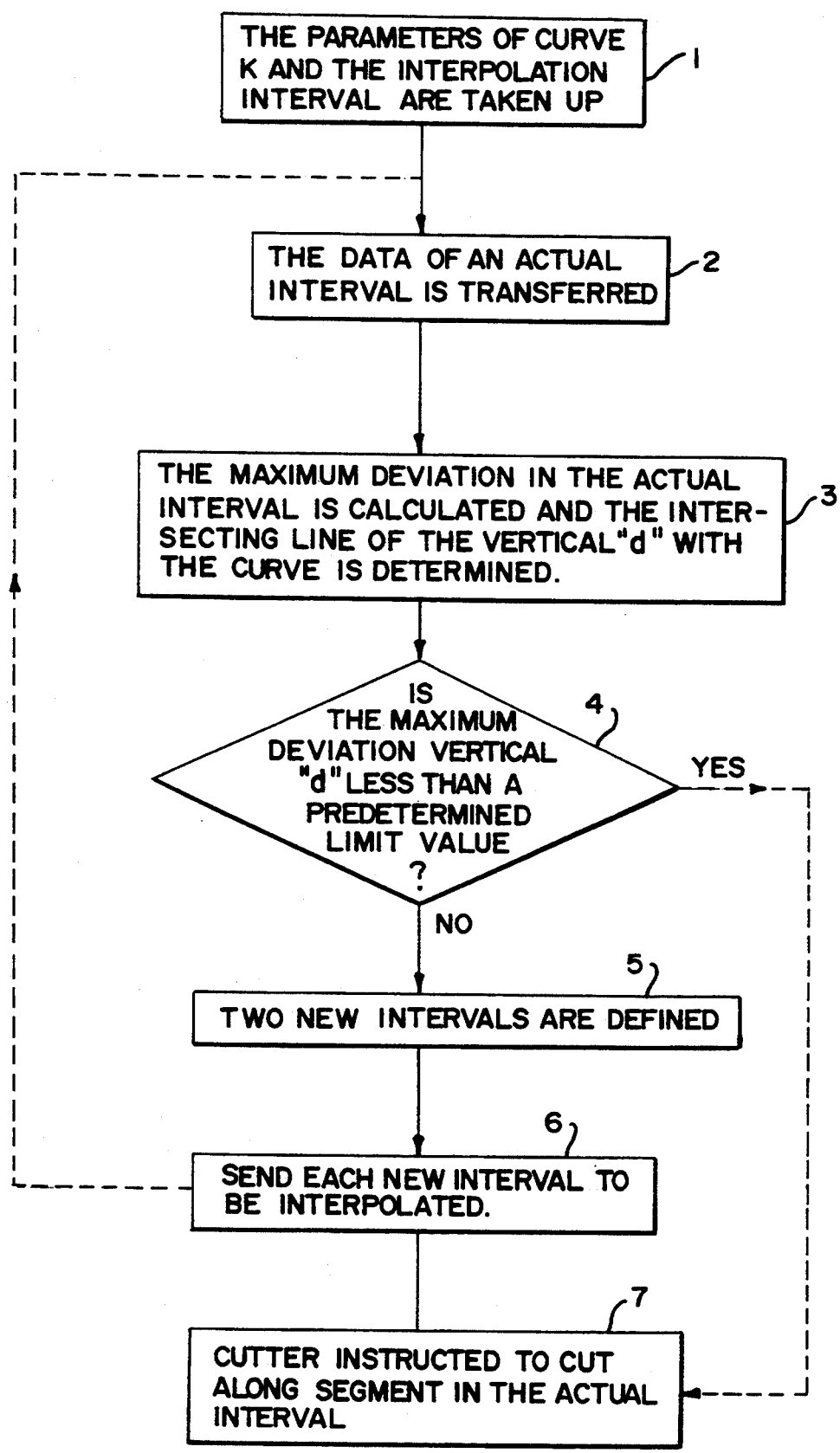
FIG. 2 illustrates a flow chart outlining the method in accordance with the present invention.

FIG. 2 illustrates a flow chart outlining the steps of the present invention in the form of process blocks. In block 1, the parameters of curve K and the interpolation interval are taken up. Then the data of an actual interval is transferred to block 2. In accordance with FIG. 1B the interval $K_i$ has a starting point $P_1$ and an ending point $P_2$. In block 3 the maximum deviation in the actual interval $K_i$ is calculated and the intersecting line of the vertical "d" with the curve K is determined. The coordinates of the point $P_3$ represent the intersection of vertical "d" with the curve K are determined.

Subsequently, in block 4 the decision is made whether the maximum deviation vertical "d" is less than a predetermined limit value. If the amount of the vertical "d" is less than this limit value, the actual interval $K_i$ is permissible, and its starting and ending points $P_1$ and $P_2$ are permissible points of the rectilinear line Ki, thus the cutter can drive from point $P_1$ to point $P_2$ along the segment $K_i$.

If the deviation vertical "d" is greater than the limit value, two new intervals $K_j$ and $K_k$ are defined in block 5. Interval $K_j$ spans from point $P_1$ to point $P_3$ and interval $K_k$ spans from point $P_3$ to point $P_2$ as shown in FIG. 1B.

In block 6 the above-described interpolation procedure is conducted for the "left" interval $K_j$ and the "right" interval $K_k$. Using the interval $K_k$ as an example, a vertical is dropped to intersect contour K at point $P_4$ where the maximum deviation of segment $K_k$ from contour K occurs within the right interval. $K_k$ is divided into two new segments $K_l$ and $K_m$. Because of this recursive use of the method, further intervals $K_l$ and $K_m$ are created in accordance with FIG. 1B until the contour K has been sufficiently approximated. Each segment of a tool path contour sufficiently approximates the contour K when the vertical dropped from the segment to the contour K is less than the predetermined limit value.

A flow chart in the form of a NASSI—Shneider diagram is included in "Method and Apparatus for Machining Workpieces with Numerically Controlled Machines" by Klaus-Dieter Körner. Portions of that flowchart marked "III" are directed specifically to the present invention and are incorporated herein.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A method for interpolating a desired contour to bring a tool path contour within an arbitrary approximation of the desired contour, said tool path contour normally composed of linear segments spanning fixed intervals, wherein linear segments representative of said tool path span intervals determined by said interpolation of said desired contour comprising the steps of:
   defining parameters of the desired contour;
   choosing a particular fixed interval of said desired contour having a starting point and an ending point located on said desired contour;
   defining a linear segment spanning said fixed interval from said starting point to said ending point;
   determining a maximum deviation between said linear segment and said desired contour;
   comparing said deviation with a predetermined value;
   defining a first and a second new interval if said deviation is greater than said predetermined value, said first new interval starting at said starting point of said fixed interval and ending at a point on said desired contour wherein said maximum deviation was determined and said second new interval starting at said point on said desired contour where said maximum deviation was determined and ending at said ending point of said fixed interval;
   replacing said linear segment spanning said fixed interval with new linear segments spanning said new intervals to provide a better approximation to said desired contour; and
   machining a workpiece along said new linear segments.

2. A method according to claim 1 further comprising the step of determining the number of new intervals created by the degree of curvature of said desired contour.

3. A method according to claim 1 further comprising the step of determining the length of said linear segments by the degree of curvature of said desired contour.

4. A method according to claim 1 further comprising the steps of recursively interpolating said desired contour.

5. An apparatus for interpolating a desired contour to bring a tool path contour within an arbitrary approximation of the desired contour wherein the tool path contour is normally composed of linear segments spanning fixed intervals comprising:
   means for defining parameters of the desired contour;
   means for choosing a particular fixed interval having a starting point and an ending point located on said desired contour;
   means for determining a maximum deviation between the linear segment and the desired contour, the segment and contour each spanning the fixed interval;
   means for comparing the deviation with a predetermined value;
   means for defining a first and a second new interval if said deviation is :greater than said predetermined value, said first new interval starting at said starting point of said fixed interval and ending at a point wherein said maximum deviation was determined and said second new interval starting at said point where said maximum deviation was determined and ending at said ending point of said fixed interval;
   means for replacing said linear segment spanning said fixed interval with new linear segments spanning said new intervals to provide a better approximation to said desired contour; and
   a numerically controlled machine for machining a workpiece along said tool path contour.

6. An apparatus according to claim 5 wherein the degree of curvature of the desired contour determines the number of new intervals created.

7. An apparatus according to claim 6 wherein said linear segments have a length determined by the degree of curvature of the desired contour.

8. An apparatus according to claim 5 wherein said linear segments have a length determined by the degree of curvature of the desired contour.

9. An apparatus according to claim 5 wherein the interpolation process is recursive.

10. A method for processing a workpiece using numerical control wherein said workpiece can be represented by at least one curved contour comprising the steps of:
   defining parameters of said curved contour;
   approximating said curved contour by fixed length linear segments spanning fixed intervals, each fixed interval having a starting point and an ending point;
   interpolating said curved contour within each fixed interval where the deviation of the curved contour from the linear segment is unacceptable by performing the interpolation steps of:
      determining a point on the .curved contour where the deviation is unacceptable;
      creating a new interval within the fixed interval where said determined point on the curved contour defines a beginning or an end of said new interval;
      generating a new segment for said new interval; and causing a tool to cut along said new segment to produce said workpiece.

11. An apparatus for processing a workpiece using numerical control wherein the workpiece can be represented by at least one curved contour comprising:
a computer having a structure for: defining parameters of the curved contour; approximating the curved contour by segments defined by fixed length intervals, each fixed interval having a starting point and an ending point; interpolating sections of the curved contour within each fixed interval where the deviation of the curved contour from the linear segment is unacceptable by: (1) determining a point on the curved contour where the deviation is unacceptable, (2) creating a new interval within the fixed interval where said determined point on the curved contour defines a beginning or an end of said new interval and generating a first new segment for each new interval;
a tool for machining the workpiece along the first new linear segment.

12. An apparatus according to claim 11 wherein the interpolation of the curved contour is recursive.

13. An apparatus according to claim 11 wherein the structure for interpolating:
creates a second new interval within the fixed interval where said determined point on the curved contour defines a beginning or an end of said second new interval, and
generates a second new linear segment spanning said second new interval.

14. An apparatus according to claim 13 wherein the number of new intervals created within a fixed interval is dependent upon the degree of curvature of the contour.

15. An apparatus according to claim 13 wherein the length of the first and second new segments is dependent upon the degree of curvature of the contour.

16. An apparatus according to claim 13 wherein the interpolation of the curved contour is recursive.

17. An apparatus according to claim 13 wherein said tool machines the workpiece along the second new linear segment.

18. An apparatus for interpolating a desired contour to bring a tool path contour within an arbitrary approximation of the desired contour comprising:
a numerically controlled machine having a computer capable of running a program that defines parameters of the desired contour; chooses a particular fixed interval having a starting point and an ending point and creates a linear segment joining these two points; determines a maximum deviation between the linear segment and the desired contour, the segment and contour each spanning the fixed interval; compares the deviation with a predetermined value and determines a point on the desired contour where the deviation is a maximum and defines a first new interval within the fixed interval if the deviation is greater than the predetermined value, and replaces the linear segment spanning the fixed interval with a first new linear segment spanning said first new interval, where said determined point on the curved contour defines a beginning or an end of said first new interval; and
a tool directed by the numerically controlled machine to machine a workpiece along the first new linear segment spanning the first new interval.

19. A method for interpolating a desired contour to bring a tool path contour within an arbitrary approximation of the desired contour, said tool path contour normally composed of linear segments spanning fixed intervals, wherein linear segments representative of said tool path span intervals determined by said interpolation of said desired contour comprising the steps of:
choosing a particular fixed interval of said desired contour having a starting point and an ending point located on said desired contour;
defining a linear segment spanning said fixed interval from said starting point to said ending point;
determining a maximum deviation between said linear segment and said desired contour;
comparing said deviation with a predetermined value;
determining the deviation point on said desired contour where the maximum deviation exists if said deviation is greater than said predetermined value;
replacing said linear segment with a first new segment starting at said starting point of said fixed interval and ending at said deviation point and a second new segment point on said desired contour wherein said maximum deviation was determined; and
machining a workpiece along said first new segment.

20. The method of claim 19, further comprising the steps of:
replacing said linear segment with a second new segment starting at said deviation point and ending at said ending point of said fixed interval;
machining said workpiece along said second new segment.

21. An apparatus for interpolating a desired contour to bring a tool path contour within an arbitrary approximation of the desired contour wherein the tool path contour is normally composed of linear segments spanning fixed intervals comprising:
means for choosing a particular fixed interval of said desired contour having a starting point and an ending point located on said desired contour;
means for defining a linear segment spanning said fixed interval from said starting point to said ending point;
means for determining a maximum deviation between said linear segment and said desired contour;
means for comparing said deviation with a predetermined value;
means for determining the deviation point on said desired contour where the maximum deviation exists if said deviation is greater than said predetermined value;
means for replacing said linear segment with a first new segment starting at said starting point of said fixed interval and ending at said deviation point and a second new segment point on said desired contour wherein said maximum deviation was determined; and
a numerically controlled machine for machining a workpiece along said first new segment.

22. The apparatus of claim 21, further comprising the steps of:
means for replacing said linear segment with a second new segment starting at said deviation point and ending at said ending point of said fixed interval;
said numerically controlled machine machining said workpiece along said second new segment.

23. A method for interpolating a desired contour having a beginning point and an end point so as to bring a tool path contour within an arbitrary approximation of the desired contour, said method comprising the steps of:

selecting a fixed interval value for said desired contour;

dividing said desired contour into a multiple number of fixed intervals, each fixed interval having a first end point and second end point separated from each other by said fixed interval value, generating linear segments spanning said first and second end points for each of said multiple number of fixed intervals;

replacing any generated linear segments with two or more connected new segments when the deviation between the curved contour from the linear segment is unacceptable; and machining a workpiece along said two or more connected new segments.

24. The method of claim 23, wherein said replacing step comprises the steps of:

determining a maximum deviation between each of said generated linear segments and said desired contour;

comparing said maximum deviation determined for each linear segment with a predetermined value;

determining the deviation point on said desired contour where the maximum deviation exists if said deviation is greater than said predetermined value;

substituting said linear segment with a first new segment starting at said starting point of said fixed interval and ending at said deviation point.

25. The method of claim 24, the substituting step further comprising the step of:

replacing said linear segment with a second new segment starting at said deviation point and ending at said ending point of said fixed interval.

26. The method of claim 24, further comprising the step of performing the replacing step on said first new segment.

27. The method of claim 23, further comprising the step of performing the replacing step on all new segments.

28. The apparatus of claim 23, further comprising:

means for determining a maximum deviation between each of said generated linear segments and said desired contour;

means for comparing said maximum deviation determined for each linear segment with a predetermined value;

means for determining the deviation point on said desired contour where the maximum deviation exists if said deviation is greater than said predetermined value; and means for substituting said linear segment with a first new segment starting at said starting point of said fixed interval and ending at said deviation point.

29. The apparatus of claim 28 wherein said means for substituting comprises means for replacing said linear segment with a second new segment starting at said deviation point and ending at said ending point of said fixed interval.

30. The apparatus of claim 28 wherein said means for replacing operates on said first new segment.

31. An apparatus for interpolating a desired contour having a beginning point and an end point so as to bring a tool path contour within an arbitrary approximation of the desired contour, said apparatus comprising:

means for selecting a fixed interval value for said desired contour;

means for dividing said desired contour into a multiple number of fixed intervals, each fixed interval having a first end point and second end point separated from each other by said fixed interval value, means for generating linear segments spanning said first and second end points for each of said multiple number of fixed intervals;

means for replacing any generated linear segments with two or more connected new segments when the deviation between the curved contour from the linear segment is unacceptable; and a machine for machining a workpiece along said two or more connected new segments.

32. The apparatus of claim 31 wherein said means for replacing operates on all new segments.

* * * * *

UNITED STATES PATENT AND TRADEMARK OFFICE
CERTIFICATE OF CORRECTION

PATENT NO. : 5,434,793
DATED : July 18, 1995
INVENTOR(S) : Klaus-Dieter Korner

It is certified that error appears in the above-indentified patent and that said Letters Patent is hereby corrected as shown below:

Column 6, line 23, delete ":".

Column 6, line 61, delete ".".

Signed and Sealed this

Ninth Day of April, 1996

*Attest:*

BRUCE LEHMAN

*Attesting Officer*     *Commissioner of Patents and Trademarks*